United States Patent [19]

Shikada et al.

[11] Patent Number: 4,700,352

[45] Date of Patent: Oct. 13, 1987

[54] FSK LASER TRANSMITTING APPARATUS

[75] Inventors: Minoru Shikada; Shuntaro Yamazaki; Sadao Fujita, all of Tokyo, Japan

[73] Assignee: NEC Corporation, Tokyo, Japan

[21] Appl. No.: 804,436

[22] Filed: Dec. 4, 1985

[30] Foreign Application Priority Data

Dec. 5, 1984 [JP] Japan ............................. 59-256666

[51] Int. Cl.⁴ ............................. H01S 3/10; G02F 1/00
[52] U.S. Cl. ............................. 372/20; 372/26; 372/28; 455/609
[58] Field of Search ............................. 372/32, 44, 20, 26, 372/28, 29, 50; 455/608, 609, 617; 375/42, 45, 47; 331/179

[56] References Cited

U.S. PATENT DOCUMENTS 4,564,946  1/1986  Olsson et al. ............................. 372/50
4,608,697  8/1986  Coldren ............................. 372/50

OTHER PUBLICATIONS

S/N and Error Rate Evaluation for an Optical FSK-Heterodyne Detection System Using Semiconductor Lasers (*IEEE Journal of Quantum Electronics*, vol. QE-19, No. 2, Feb. 1983).

Optical Heterodyne Detection of Directly Frequency Modulated Semiconductor Laser Signals (Electronics Letters Oct. 23, 1980, vol. 16, No. 22).

Optical FSK Signal Detection in a Heterodyne System Using Semiconductor Lasers (Electronics Letters, May 27, 1982, vol. 18, No. 11).

*Primary Examiner*—James W. Davie
*Assistant Examiner*—Georgia Y. Epps
*Attorney, Agent, or Firm*—Schwartz, Jeffery, Schwaab, Mack, Blumenthal & Evans

[57] ABSTRACT

In an FSK laser transmitting apparatus, a light source can change the output light frequency. A driver performs FSK of the light source with a plurality of values. A beam splitter splits the output light from the light source into two split beams. A delay circuit delays one of the two split beams with respect to the other. A beam coupler combines delayed and nondelayed beams as the two split beams from the beam splitter. A controller detects the beat frequency of combined light from the beam coupler and supplies a control signal to the driver so as to set the beat frequency to be a predetermined value.

5 Claims, 8 Drawing Figures

FSK LASER TRANSMITTING APPARATUS

BACKGROUND OF THE INVENTION

The present invention relates to an FSK laser transmitting apparatus.

Since an output light intensity can be easily modulated upon on/off operation of injection current in semiconductor lasers, they have been used as light sources of optical fiber communications in a variety of applications. Furthermore, an oscillation frequency of a semiconductor laser varies due to a small variation in injection current, so that signal transmission can be performed in accordance with a so-called frequency shift keying (FSK) scheme. By utilizing FSK signal transmission with heterodyne detection, an effective communication system is being developed to achieve long-distance transmission with a good light reception sensitivity effect.

A frequency difference between symbols of the signal must be given as a predetermined value in the FSK system. However, dependency of an oscillation frequency or oscillation wavelength of the semiconductor laser on the modulation current is not constant. In addition, the oscillation frequency or wavelength also greatly varies in accordance with the structure parameters of the semiconductor laser, the bias current and the modulation frequency.

As is known well, for example, the oscillation frequency varies in the range of 100 MHz to several GHz per 1-mA modulation current. For this reason, frequency modulation in the semiconductor laser must be performed such that a frequency shift in the signal transmitter is given as a predetermined value. However, a conventional signal transmitter consists of a light source and its driver. Therefore, no control for frequency shift is provided in any conventional system.

SUMMARY OF THE INVENTION

It is, therefore, an object of the present invention to provide a laser transmitting apparatus for transmitting as a laser signal an FSK signal having a frequency shift controlled to be a predetermined value.

In order to achieve the above object of the present invention, there is provided an FSK laser transmitting apparatus comprising: a light source adapted to change a frequency of output light therefrom; driving means for frequency-shift-keying the light source with a plurality of values; a beam splitter for splitting the output light from the light source into two split beams; delaying means for delaying one of the two split beams with respect to the other; a beam coupler for combining delayed and nondelayed beams as the two split beams from the beam splitter; and control means for detecting a beat frequency of combined light from the beam coupler and supplying a control signal to the driving means so as to set the beat frequency to be a predetermined value.

DETAILED DESCRIPTION OF THE PREFERRED EMBODIMENTS

Preferred embodiments of the present invention will be described with reference to the accompanying drawings.

Figure 1:
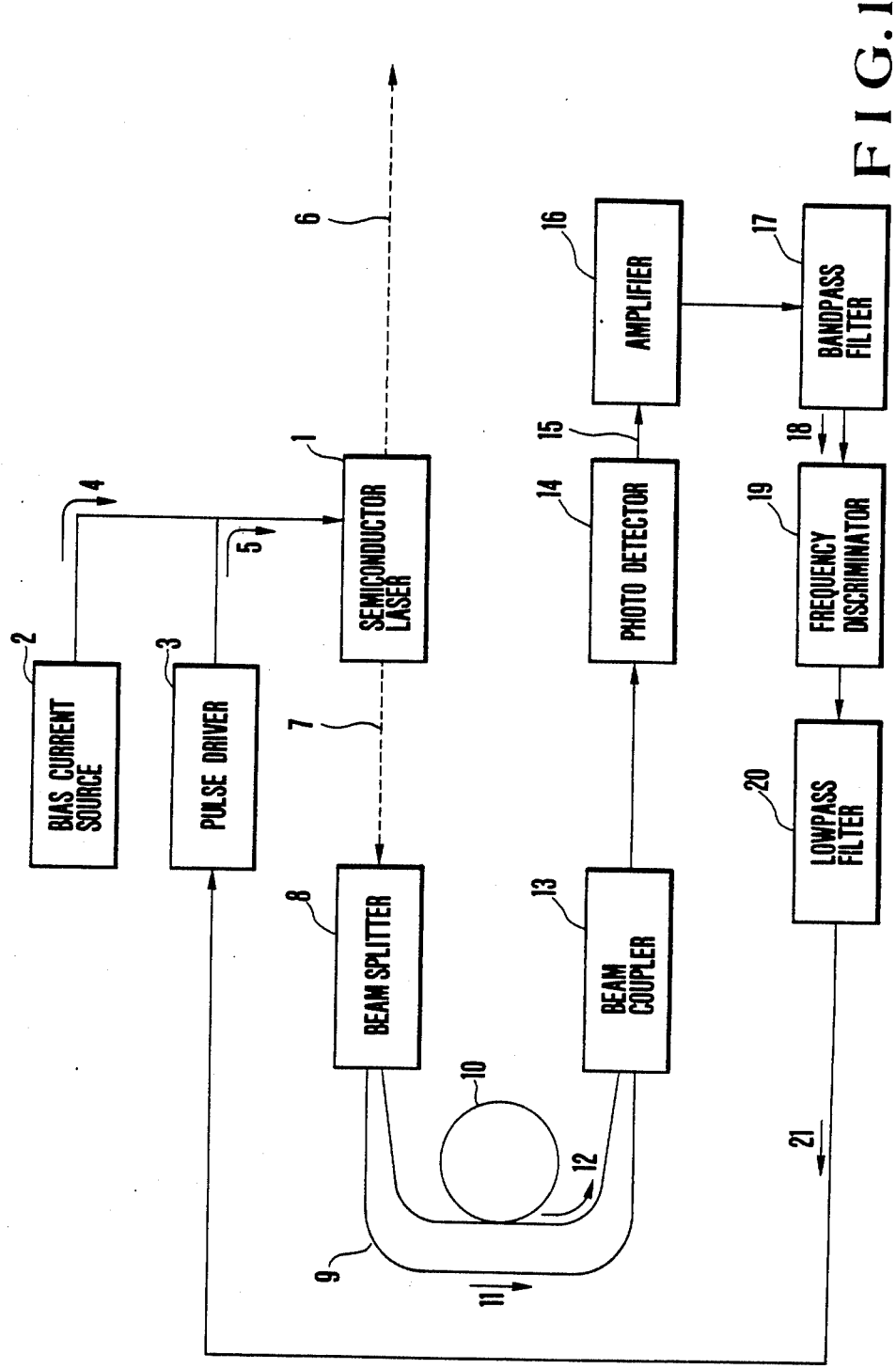
FIG. 1 is a block diagram of an FSK transmitting apparatus according to an embodiment of the present invention.

FIG. 1 shows an FSK transmitting apparatus according to a first embodiment of the present invention. Referring to FIG. 1, a bias current 4 from a bias current source 2 and a current pulse signal 5 from a pulse driver 3 are supplied to a 1.3-$\mu$m distributed-feedback semiconductor laser (to be referred to as a laser hereinafter) 1. The semiconductor laser 1 generates binary FSK signal light 6. In this case, a frequency shift and a bit rate are set to be 600 MHz and 100 Mb/s, respectively. Dependency of the frequency shift on the pulse current in the semiconductor laser 1 is about 200 MHz/mA. In order to sufficiently stabilize the 600-MHz frequency shift, the pulse driver 3 is set to have an output pulse current of 3±1.5 mA. Since the semiconductor laser 1 has both ends as a cleaved facet, reference light 7 subjected to the same FSK modulation as in signal light 6 can be obtained at an opposite surface. The reference light 7 is split by a beam splitter 8 into two split reference beams 11 and 12. The reference beams 11 and 12 are coupled to optical fibers 9 and 10 which have different lengths. In this case, the difference between the lengths of the optical fibers 9 and 10 is set to be about 2 m, so that a propagation delay between the reference beams 11 and 12 is 10 ns, i.e., one bit duration. The reference beams 11 and 12 are combined by a beam coupler 13. The beam splitter 8, the optical fibers 9 and 10 and the beam coupler 13 are constituted by polarization maintaining single mode fibers which do not rotate the polarization plane. The reference beams 11 and 12 are stably and effectively combined with the same polarization plane in the fiber. The beam splitter 8 and the beam coupler 13 are prepared such that the two fibers 9 and 10 are aligned adjacent to each other and heated and stretched.

An output from the beam coupler 13 is supplied to a photodetector 14. A beat signal 15 between the reference beams 11 and 12 is generated as an electrical signal by the photodetector 14. The above operation is called delayed self heterodyne detection.

Figure 2A:
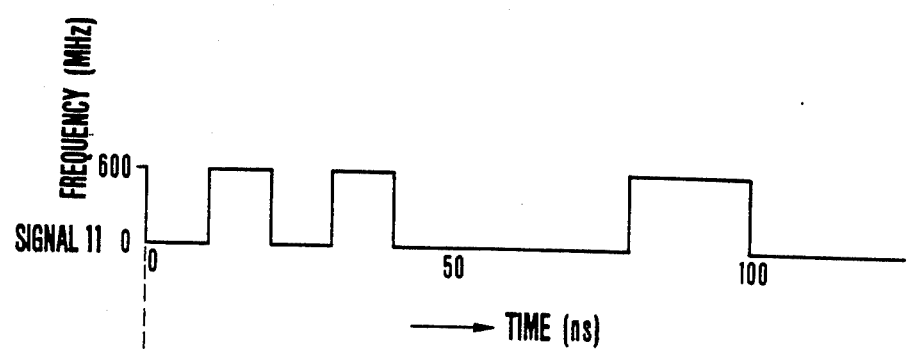
FIGS. 2A, 2B and 2C are timing charts for explaining the operation of the apparatus shown in FIG. 1.
Figure 2B:
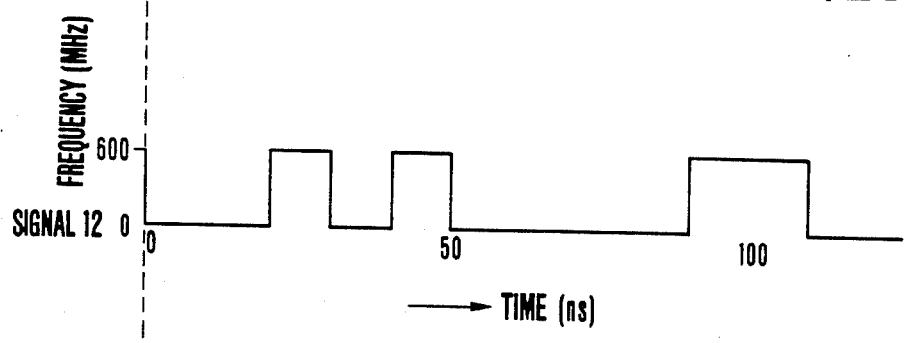
Figure 2C:
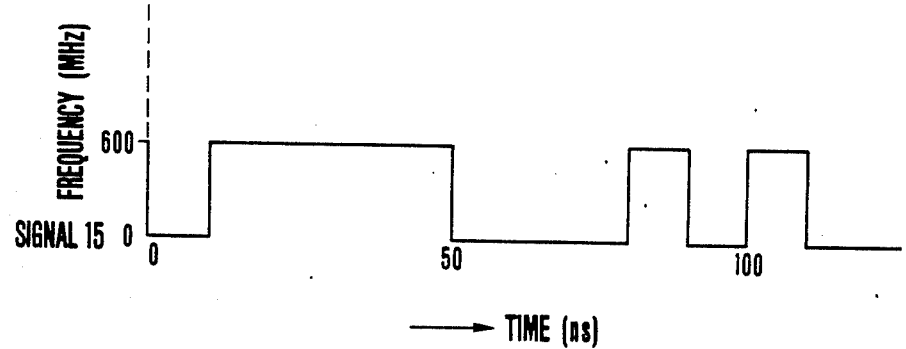

FIGS. 2A, 2B and 2C are timing charts showing waveforms of the reference beams 11 and 12 and the beat signal 15 as a function of time. As shown in FIGS. 2A to 2C, the frequency shift of the signal light 6 is 600 MHz, so that a difference between the instantaneous frequencies of the reference beams 11 and 12 occurs at 0 Hz and ±600 MHz. Therefore, the beat signal 15 has peaks at 0 Hz and 600 MHz. The 600-MHz beat frequency directly corresponds to the frequency shift of the signal light. When the pulse driver 3 is controlled so as to keep the 600-MHz beat frequency to be constant, the FSK modulation index can be identical.

The beat signal 15 is amplified by an amplifier 16, and a band-pass filter 17 extracts only a 600-MHz beat component 18 of the FSK signal. The 600-MHz beat component is supplied to a frequency discriminator 19. The frequency discriminator 19 compares the center frequency of the beat component 18 with a reference frequency. An error signal 21 from the frequency discriminator 19 is fed back to the pulse driver 3 through a low-pass filter 20. The pulse driver 3 changes an amplitude of the pulse current 5 in accordance with the error signal 21, so that the center frequency of the beat component 18 matches with the reference frequency.

Figure 3:
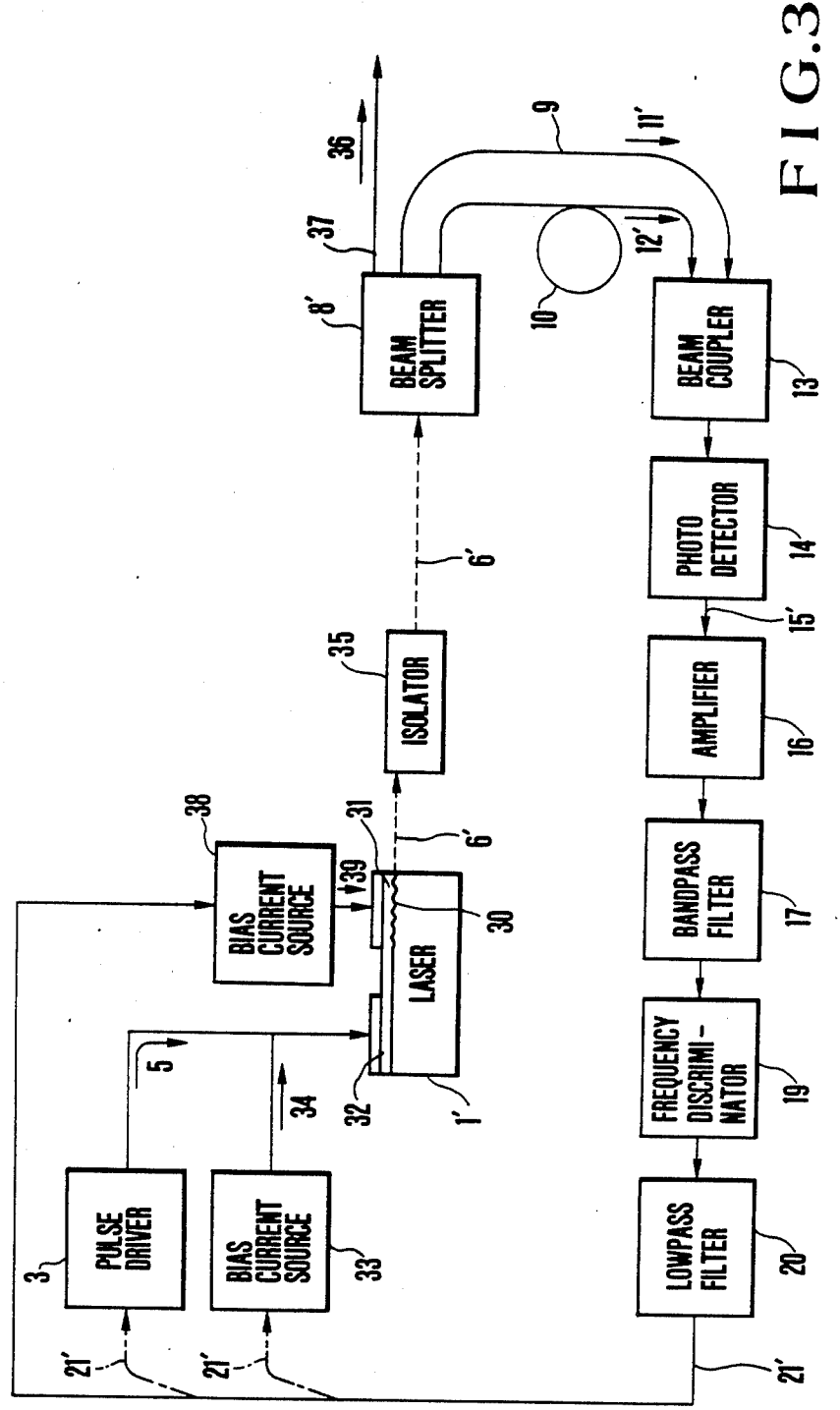
FIG. 3 is a block diagram of an FSK transmitting apparatus according to another embodiment of the present invention.
Figure 4A:
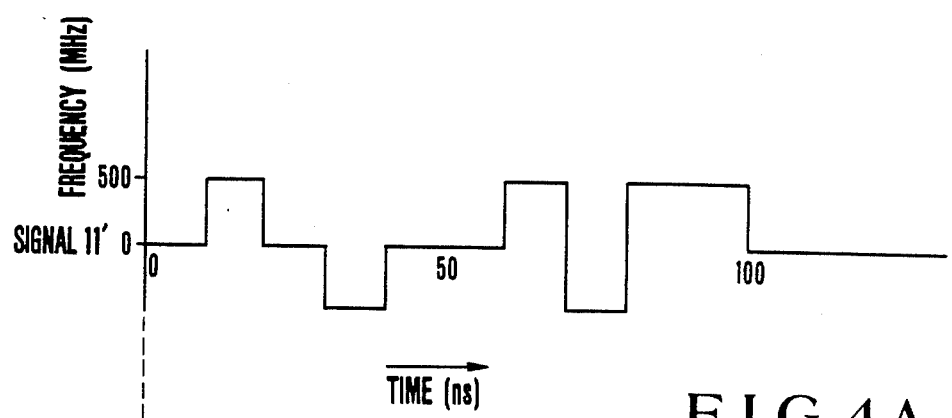
FIGS. 4A, 4B and 4C are timing charts for explaining the operation of the apparatus shown in FIG. 3.
Figure 4B:
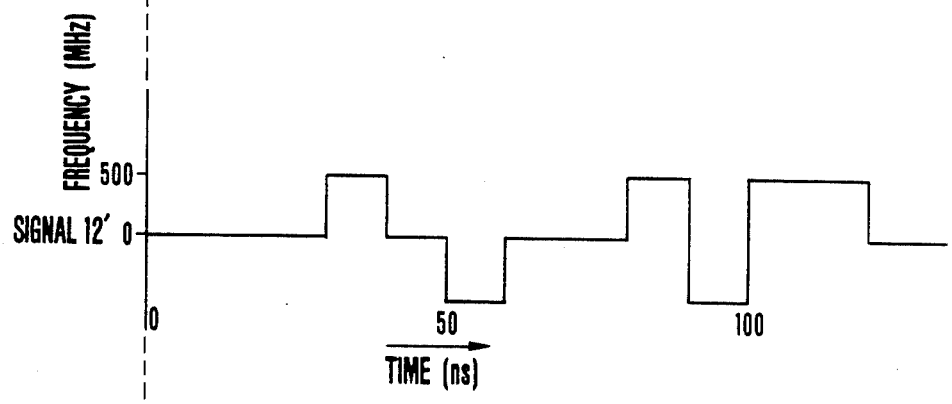
Figure 4C:
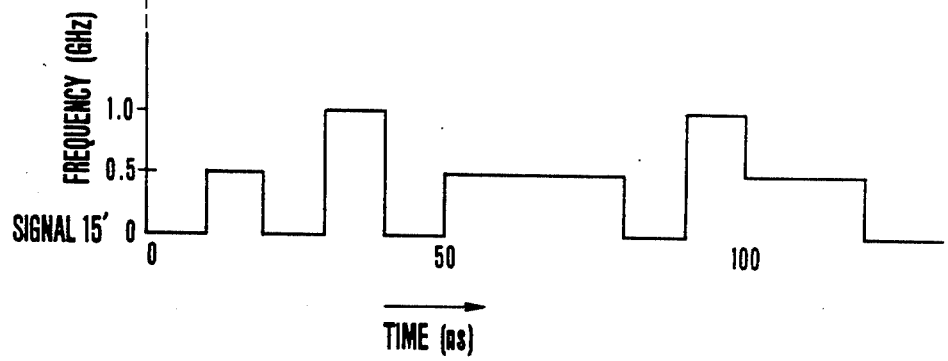

FIG. 3 is a block diagram of an FSK transmitting apparatus according to a second embodiment of the present invention, and FIGS. 4A, 4B and 4C show a detection state of the frequency shift. The apparatus of the second embodiment is substantially the same as that of the first embodiment, except that three-level FSK is performed, the reference beams are extracted from the transmitting signal light itself, and a special laser with a control electrode is used.

A laser 1' in the second embodiment comprises a single longitudinal mode semiconductor laser element. This element has an active region 31 which contains a distributed-feedback grating layer 30 and a control region 32 formed in a portion extended from the region 31. FSK signal light 6' can be extracted by changing a current injected in the control region 32. A bias current 34 from a bias current source 33 and a three-level pulse current 5 from a pulse driver 3 are supplied to the control region 32. The laser 1' then generates the three-level FSK signal light 6'. The signal light 6' passes through an isolator 35 and is split by a beam splitter 8' into a selected signal beam 36 and reference beams 11' and 12'. The reference beams 11' and 12' are coupled to optical fibers 9' and 10' having different lengths. The beam splitter 8' comprises an optical fiber which does not rotate the polarization plane in the same manner as in FIG. 1. A transmission optical fiber 37 and the optical fibers 9' and 10' are partially brought into contact with each other and are heated and stretched to prepare the beam splitter 8'. The functions and operations of a beam coupler 13, a photodetector 14, an amplifier 16, a band-pass filter 17, a frequency discriminator 19 and a low-pass filter are similar to those in the first embodiment. The signal light 6' is modulated with 100 Mb/s, and the frequency shift between the codes is selected to be 500 MHz. A propagation delay between the reference beams 11' and 12' corresponds to 2 bits duration. In this case, the reference beams 11' and 12' and a beat signal 15' have the relationship as illustrated in FIGS. 4A, 4B and 4C. The beat signal 15' can have frequencies of 0 MHz, 500 MHz and 1 GHz. Only the 500-MHz beat component is extracted by the band-pass filter 17 and is supplied to the frequency discriminator 19. A bias current 39 from a bias current source 38 is supplied to the active region 31 in the laser 1'. Dependency (i.e., dependency of the frequency shift on the peak value of the pulse current 5') of laser frequency shift on the pulse current is determined by the bias current 39. There is a region of the bias current 39 in which the frequency shift increases upon an increase in the bias current 39. According to the second embodiment, an error signal 20 from the frequency discriminator 19 is fed back to the bias current source 38 which then controls the magnitude of the bias current 39, thereby obtaining a constant value of the frequency shift.

In the embodiment of FIG. 3, an error signal 21' from the low-pass filter may be fed back to the pulse driver 3, as indicated by the alternate long and short dashed line, in the same manner as in the embodiment of FIG. 1, or to the bias current source 33 to achieve the same FSK shift control as in the first embodiment.

The present invention is not limited to the above modification. Other various changes and modifications may be made within the spirit and scope of the invention. The light source comprises the distributed-feedback semiconductor laser 1 in each embodiment. However, other lasers such as an external cavity semiconductor laser, a gas laser, and a solid-state laser may be utilized in place of the distributed-feedback semiconductor laser. The injection current to the semiconductor laser 1 achieved the FSK modulation. However, a modulator built into a resonator in a laser excluding a semiconductor laser can be used. Alternatively, the FSK can be made by displacing the position of a mirror in the resonator along the direction of the optical axis. In the above embodiments, binary and three-level modulation techniques are utilized. However, an FSK scheme adapting 4 or more multilevels can be used.

In the above embodiments, single mode fibers which do not rotate the polarization plane are aligned adjacent to each other, heated and stretched to prepare the beam splitter 8 and the beam coupler 13. However, a mechanism utilizing a small lens or an interference film filter can be used. Furthermore, the optical fiber may comprise a normal single mode fiber in place of the above-mentioned single mode fiber. In addition, collimated beams may be utilized as the two reference beams instead of using the optical fibers and may be transmitted in air and then combined.

What is claimed is:

1. An FSK laser transmitting apparatus comprising:
   a light source capable of changing a frequency of an output light therefrom;
   driving means connected with said light source for frequency-shift-keying said light source with a plurality of values;
   a beam splitter positioned to receive said output light from said light source for splitting the output light from said light source into two split beams;
   delaying means connected with said beam splitter for delaying one of the two split beams with respect to the other to produce a delayed and a non-delayed beam;
   a beam coupler positioned to receive said delayed and non-delayed beams for combining the delayed beam through said delaying means and said non-delayed beam to output a combined light beam; and
   control means coupled to receive said combined light beam from said beam coupler for detecting a beat frequency of the combined light beam from said beam coupler and supplying a control signal to said driving means so as to set the beat frequency to be a predetermined value.

2. An apparatus according to claim 1, wherein said control means comprises means for selecting one of a plurality of beat frequencies from said beam coupler, said one beat frequency corresponding to the frequency shift; and means for detecting a difference between said one beat frequency and a reference frequency and generating the difference as the control signal.

3. An apparatus according to claim 1, wherein said light source comprises a semiconductor laser, and said driving means includes a pulse driver for supplying a pulse signal to said light source and a bias circuit for generating a bias current, said pulse driver being controlled by said control means.

4. An apparatus according to claim 1, wherein said light source comprises a semiconductor layer with an active region and a control region, said driving means comprises a pulse driver, a first bias circuit, said pulse driver and said first bias circuit cooperating to supply a modulation signal to said control region, and a second bias circuit for supplying a bias current to said active region, and the control signal from said control means is supplied to said pulse driver, and said first or second bias circuit.

5. An apparatus according to claim 1, wherein said delaying means comprises two optical fibers having different lengths each fiber coupled to said beam splitter and said beam coupler.

* * * * *